United States Patent Office 2,797,739
Patented July 2, 1957

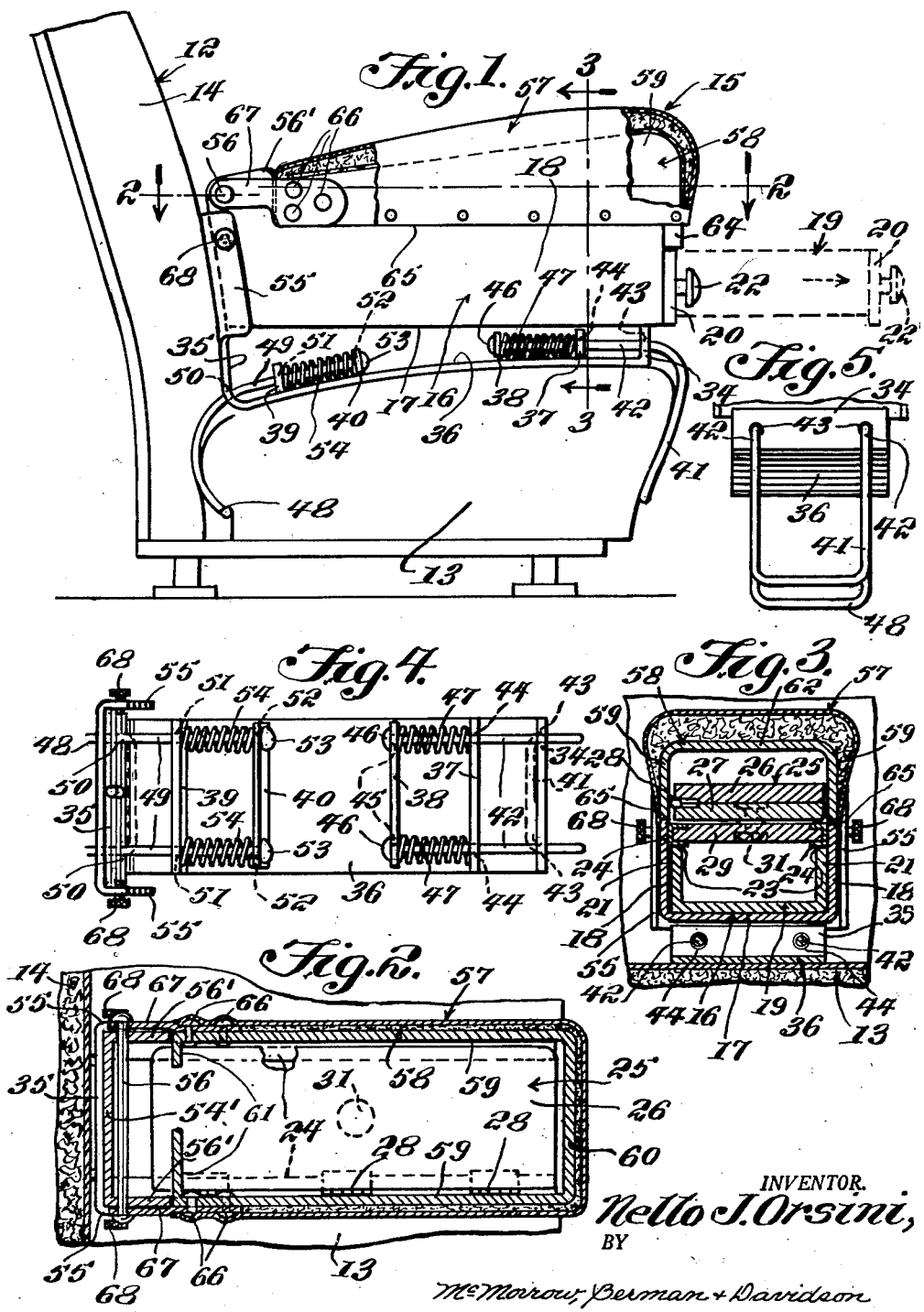

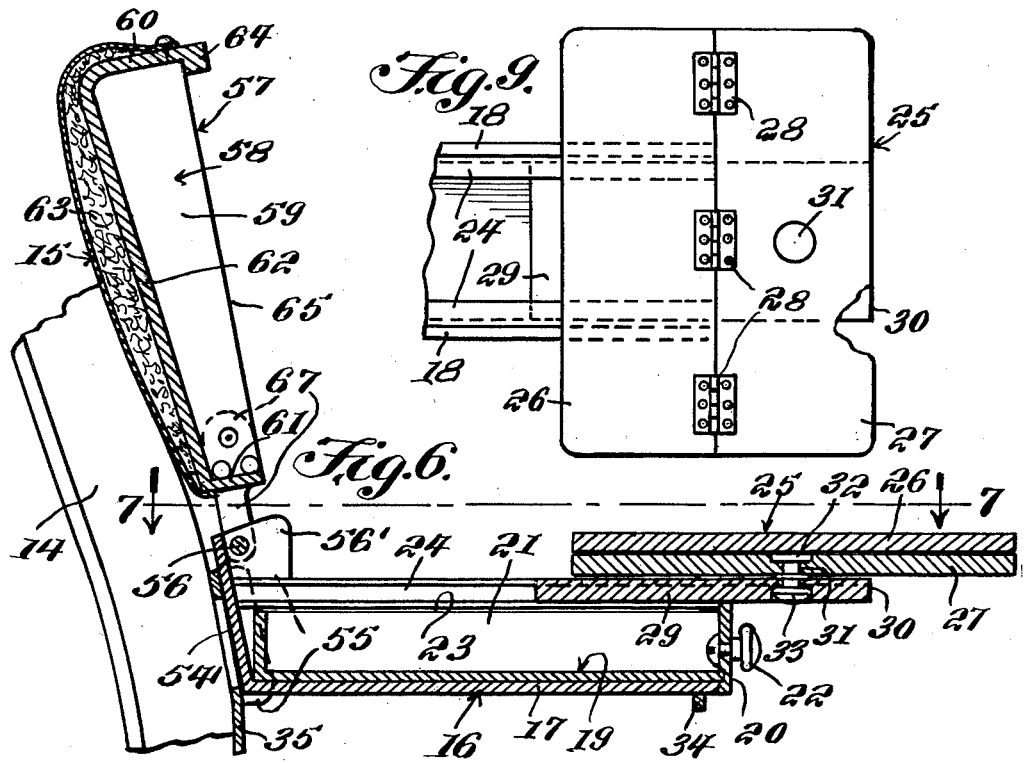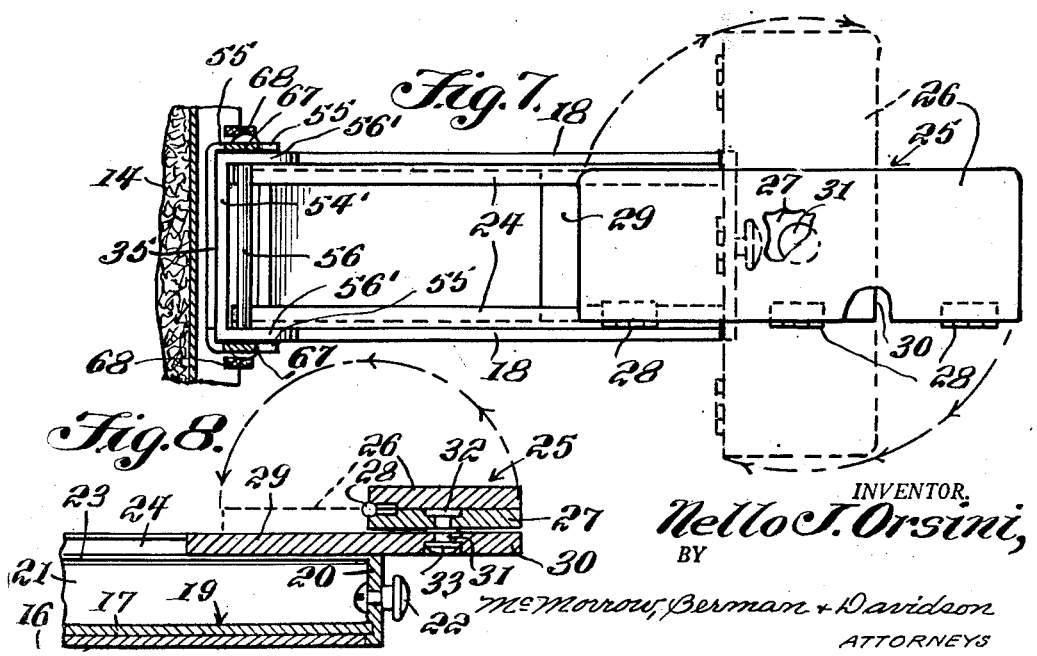

2,797,739

COMBINED ARM REST, TABLE AND DRAWER FOR VEHICLE SEATS

Nello J. Orsini, Madison Heights, Mich.

Application November 27, 1953, Serial No. 394,719

6 Claims. (Cl. 155—112)

This invention relates to a combined arm rest, table, and drawer attachment for vehicle seats, especially for the front and rear seats of passenger automobiles.

Among important objects of the invention are to provide a useful attachment of the character indicated above which is operable from arm resting position to provide a table for writing or reading or for other purposes, and has a drawer to contain writing materials, maps, and the like, the attachment being highly integrated in construction, readily portable, and easily installed and removed from a vehicle seat in a secure and comfortable position.

Other important objects and advantageous features of the invention will be apparent from the following description and the accompanying drawings, wherein, for purposes of illustration rather than limitation, a specific embodiment of the invention is set forth in detail.

Figure 1 is a side elevation, partly broken away, and showing the drawer in open position in phantom lines;

Figure 2 is a fragmentary horizontal section taken on the line 2—2 of Figure 1;

Figure 3 is a fragmentary transverse vertical section taken on the line 3—3 of Figure 1;

Figure 4 is a top plan view of the seat engaging structure alone;

Figure 5 is a front elevation thereof;

Figure 6 is a vertical longitudinal section, showing the arm rest member and the table member in withdrawn positions, and taken centrally through the attachment;

Figure 7 is a horizontal section taken on the line 7—7 of Figure 6 and showing the table in withdrawn position and in position to be unfolded for use;

Figure 8 is a fragmentary vertical longitudinal section taken centrally through the drawer and table structure; and, Figure 9 is a fragmentary view similar to Figure 7 and showing the table unfolded to position of use.

Referring in detail to the drawings, wherein like numerals designate like parts throughout the several views, the numeral 12 generally designates an automobile seat structure, having a seat cushion 13, and a back 14, upon which is installed a device in accordance with the present invention, generally designated 15.

The device 15 comprises an elongated and relatively narrow box-like frame or body 16 which includes a bottom wall 17 and opposite side walls 18, 18. Slidably resting upon the bottom wall 17 between the side walls 18, 18 is a drawer 19, which is somewhat shorter than the frame 16, and has a front wall 20 which extends laterally beyond its side walls 21, 21 so as to abut the forward ends of the frame side walls 18, 18 and the frame bottom wall 17, in the closed position of the drawer 19. A drawer pull 22 is provided on the front wall 20 of the drawer 19.

Secured by suitable means to the laterally inward sides of the frame side walls 18, 18 immediately above and in retaining relation to the upper edges 23, 23 of the drawer side walls 21, 21 are facing channel guides, 24, 24.

A folding table 25 is composed of two similar elongated rectangular sections 26 and 27 which are hinged together along longitudinal edges, by hinges 28, in such manner that the section 26 can be folded from a position on and over the section 27 to coplanar relation to the section 27, as shown in Figures 6 to 9.

The table 25 further comprises a slide plate 29 whose side edges are slidably confined in the channel guides, 24, 24. The slide plate 29 is somewhat shorter than the table sections 26 and 27 and underlies the section 27. The slide plate 29 has a forward end 30 near which the slide plate 29 is traversed by a vertical pivot 31 which also traverses the table section 27. Countersunk upper and lower heads 32 and 33, respectively, retained rotatable and supporting engagement of the slide plate 29 and table section 27.

As shown in Figures 6 to 9, the table 25 is adapted to be pulled forwardly from a folded and stored position in the frame 16 to a withdrawn position forwardly of the frame 16, then turned at right angles (Figure 7) to the frame 16, and opened to position of use by swinging the section 26 rearwardly onto the slide plate 29.

The frame 16 is secured in suitable manner at its front end to the front upstanding end flange 34 of a seat cushion engaging plate 36. The plate 36 is herein shown as upwardly bowed or concaved, so as to conform to the curvature of the seat cushion 13, and is of a length to extend across and engage a major portion of the width of the seat cushion 13.

Extending transversely across the top of the seat cushion engaging plate 36 are spaced pairs of parallel fixed and free upstanding flanges 37 and 38 and 39 and 40, respectively. A front downward wire or rod bail 41, shaped to engage around and under the front edge of the seat cushion 13, has legs 42, 42 which extend rearwardly over the plate 36 and engage slidably through openings 43, 43 in the front plate flange 34 and openings 44, 44 and 45, 45 provided in the front flanges 37 and 38. Heads 46, 46 on the rear ends of the legs 42, 42 engage the rearward side of the flange 38. The flange 38 is unsecured to the plate 36, and helical expanding springs 47, 47 are circumposed on the legs 42, 42 between the flange 38 and the flange 37 whereby the bail 41 is drawn rearwardly into clamping relation to the front edge of the seat cushion 13.

A rear down-curved wire or rod bail 48 has legs 49, 49 which extend forwardly over the seat cushion engaging plate and engage slidably through openings 50, 50 in the rear plate flange 35 and engage slidably through openings 51, 51 and 52, 52 provided in the rear plate flanges 39 and 40, respectively, the flange 40 being fixed to the plate 36 and the flange 39 being unsecured to the plate 36. Heads 53, 53 on the forward ends of the legs 49, 49 bear against the forward side of the free flange 39. Helical springs 54, 54 are circumposed on the legs 49, 49 and compressed between the flanges 39 and 40, so as to clamp the rear bail 48 against the rear edge of the seat cushion 13.

Guide flanges 55, 55 extend forwardly and upwardly from the ends of a rear flange 35 on the plate 36 and rise above the frame 16. Fixed on the rear of the frame 16 is a vertical plate 54' having vertical side flanges 56', 56' rising above the frame 16. A headed hinge pin 56 extends between and through the flanges 56', 56' on a level above the frame 16, on which is hinged the arm rest member 57.

The arm rest member 57 is preferably in the form of a hollow wedge shaped body 58 having side walls 59, 59, a front end wall 60, a rear end wall 61, and a contoured top wall 62, overlaid by padding or upholstery 63. The front wall 60 has a flange 64 which depends below the lower edges 65, 65 of the side walls 59, 59.

Secured to the side walls 59, 59 near their rearward ends, as indicated at 66, are hinge brackets 67, 67 which reach rearwardly beyond the arm rest member 57 and are hingedly engaged on the hinge pin 56 at the laterally inward sides of the flanges 55, 55.

Set screws 68, 68 are threaded inwardly through the guide flanges 55, 55 for engagement with the flanges 56', 56' for holding the arm rest member in desired degrees of forward and rearward tilt relative to the frame 16.

When the arm rest member 57 is in closed position as shown in Figure 1, it encloses the table 25, in folded retracted position, and closes the top of the frame 16, with the lower edges 65 of the arm rest body side walls 59, 59 resting upon the upper edges 68, 68 of the frame side walls, and with the depending flange 64 of the arm rest member engaging the forward side of the frame side walls 18, 18 and the top of the front end wall 20 of the drawer 25, whereby the drawer is frictionally held in closed position.

What is claimed is:

1. In an automobile seat arm rest, a frame for overlying the seat cushion, a seat cushion engaging plate secured to and positioned beneath said frame for resting forwardly and rearwardly upon the seat cushion, down-curved front and rear bails for engaging around the front and rear edges of said seat cushion, and spring means acting between said bails and said seat cushion engaging plate whereby the frame is clamped to the seat cushion, said frame being hollow and having an open front end, said frame having side walls including channel guides, a slide plate engaged in said guides to move forwardly and rearwardly relative to the frame, and a table comprising two similar sections receivable between the frame side walls when in superimposed relation, means hinging the sections to be swung into coplanar relation, and means pivoting one of the table sections to the slide plate whereby the table sections can be swung relative to the frame when drawn forwardly from the frame so as to enable the sections to be swung into coplanar relation.

2. In an automobile seat arm rest, a frame for overlying the seat cushion, a seat cushion engaging plate secured to and positioned beneath said frame for resting forwardly and rearwardly upon the seat cushion, down-curved front and rear bails for engaging around the front and rear edges of said seat cushion, said frame being hollow and having an open front end, said frame having side walls including channel guides, a slide plate engaged in said guides to move forwardly and rearwardly relative to the frame, and a table comprising two similar sections receivable between the frame side walls when in superimposed relation, means hinging the sections to be swung into coplanar relation, and means pivoting one of the table sections to the slide plate whereby the table sections can be swung relative to the frame when drawn forwardly from the frame so as to enable the sections to be swung into coplanar relation, the table sections when in superimposed relation being arranged to occupy a rearward position in said frame and to be capable of being put into coplanar relation only when in a forwardly withdrawn relation to the frame.

3. In an automobile seat arm rest, a frame for overlying the seat cushion, a seat cushion engaging plate secured to and positioned beneath said frame for resting forwardly and rearwardly upon the seat cushion, down-curved front and rear bails for engaging around the front and rear edges of said seat cushion, said frame having side walls including channel guides, a slide plate engaged in said guides to move forwardly and rearwardly relative to the frame, and a table comprising two similar sections receivable between the frame side walls when in superimposed relation, means hinging the sections to be swung into coplanar relation, and means pivoting one of the table sections to the slide plate whereby the table sections can be swung relative to the frame when drawn forwardly from the frame so as to enable the sections to be swung into coplanar relation, the table sections when in superimposed relation being arranged to occupy a rearward position in said frame and to be capable of being put into coplanar relation only when in a forwardly withdrawn relation to the frame, and an arm rest member normally overlying said frame and enclosing said table in a rearward position of the table with its sections in superimposed relation, and hinge means hinging said arm rest member at its rearward end to a portion on the rear of said seat engaging plate and enabling said arm rest member to be swung upwardly and rearwardly so as to provide access to said table.

4. In an automobile seat arm rest, a hollow frame having an open top and an open forward end, a drawer slidably engaged in said frame and exposed by said open top, said drawer being withdrawable through said open forward end, said frame having sidewalls, channel guides on said sidewalls within the frame and above the drawer, a slide plate engaged in said guides and normally positioned within the frame and closing the drawer and the open top of the frame, and a table structure mounted on said slide.

5. In an automobile seat arm rest, a hollow frame having an open top and an open forward end, a drawer slidably engaged in said frame and exposed by said open top, said drawer being withdrawable through said open forward end, said frame having sidewalls, channel guides on said sidewalls within the frame and above the drawer, a slide plate engaged in said guides and normally positioned within the frame and closing the drawer and the open top of the frame, and a table structure mounted on said slide, said table structure comprising sections foldable from superimposed relation to coplanar relation while the slide is withdrawn from said frame.

6. In an automobile seat arm rest, a hollow frame having an open top and an open forward end, a drawer slidably engaged in said frame and exposed by said open top, said drawer being withdrawable through said open forward end, said frame having sidewalls, channel guides on said sidewalls within the frame and above the drawer, a slide plate engaged in said guides and normally positioned within the frame and closing the drawer and the open top of the frame, and a table structure mounted on said slide, said table structure comprising sections foldable from superimposed relation to coplanar relation while the slide is withdrawn from said frame, and an arm rest member pivoted on said frame and arranged to be swung from an operation position resting upon said frame and enclosing the table structure in the superimposed relation of the sections to an upraised inoperative position, said arm rest having sidewalls arranged to engage opposite sides of said sections in their superimposed relation with said slide plate within the frame.

References Cited in the file of this patent

UNITED STATES PATENTS

| | | |
|---|---|---|
| 1,000,801 | Hansche | Aug. 15, 1911 |
| 1,126,911 | Stull | Feb. 2, 1915 |
| 1,405,108 | Friedlander | Jan. 31, 1922 |
| 2,006,883 | Davies et al. | July 2, 1935 |
| 2,419,412 | McArthur | Apr. 22, 1947 |
| 2,633,180 | Reed | Mar. 31, 1953 |
| 2,633,899 | Armstrong | Apr. 7, 1953 |
| 2,663,603 | Newman | Dec. 22, 1953 |
| 2,694,441 | Degenfelder | Nov. 16, 1954 |